A. GOHMANN.
GAS PRODUCING OVEN.
APPLICATION FILED JUNE 21, 1911.
1,024,128.
Patented Apr. 23, 1912.
3 SHEETS—SHEET 1.
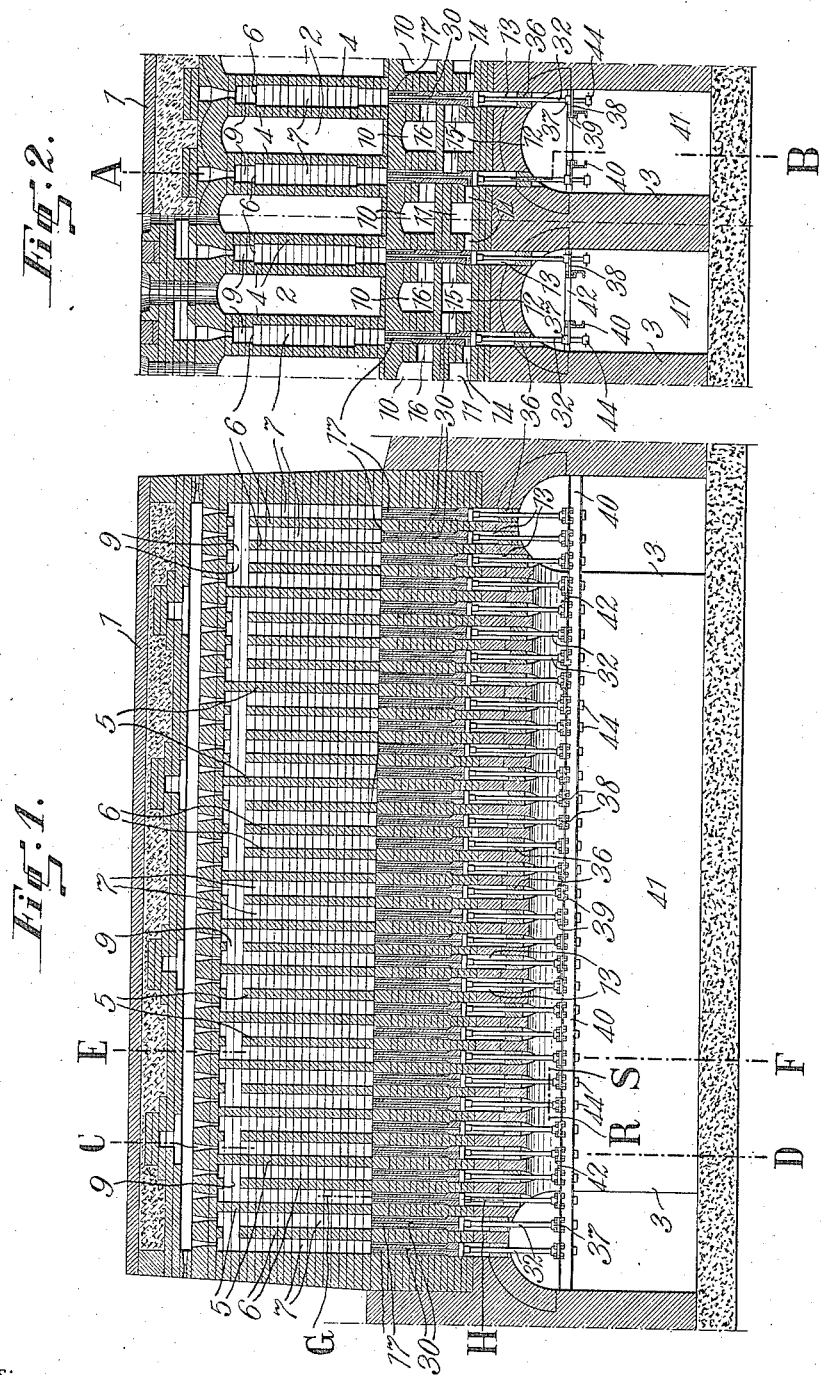
Witnesses:
Charles Mathie
Ethel Black
Inventor
Arthur Gohmann
by
John Lotka
Attorney

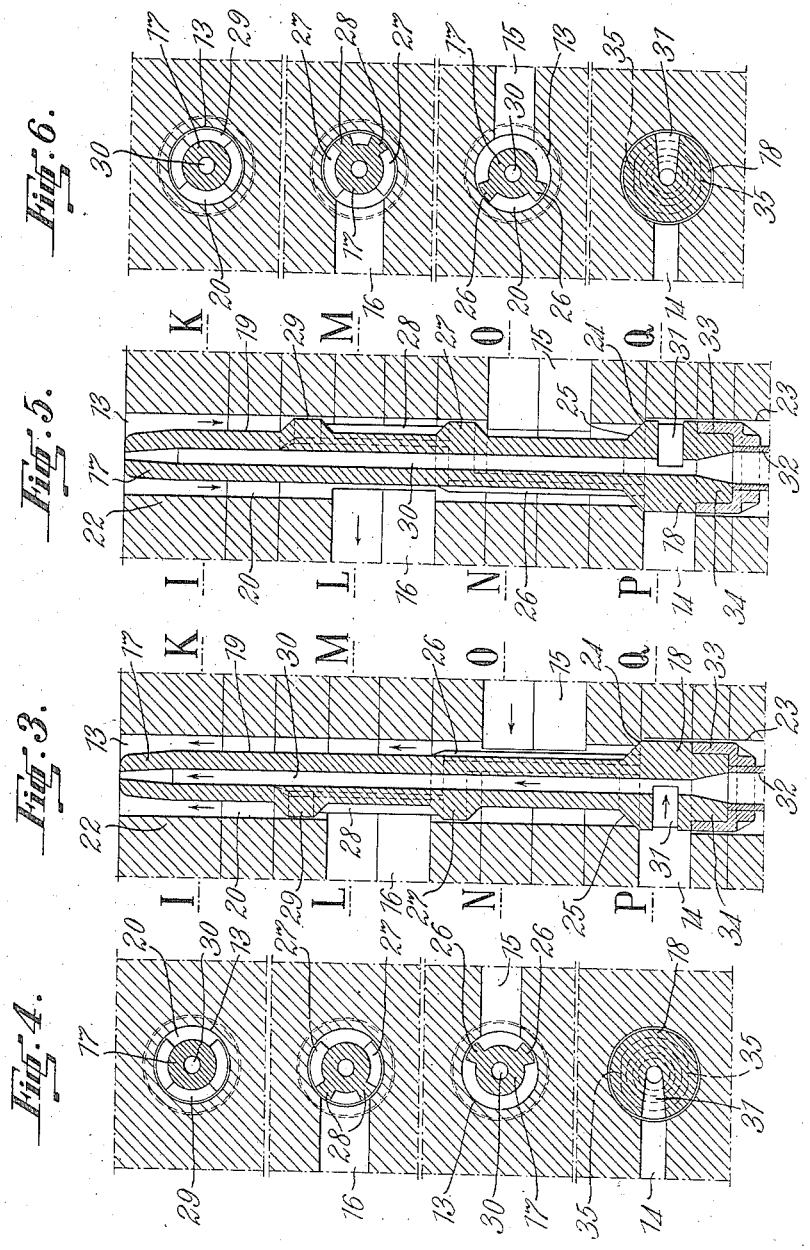

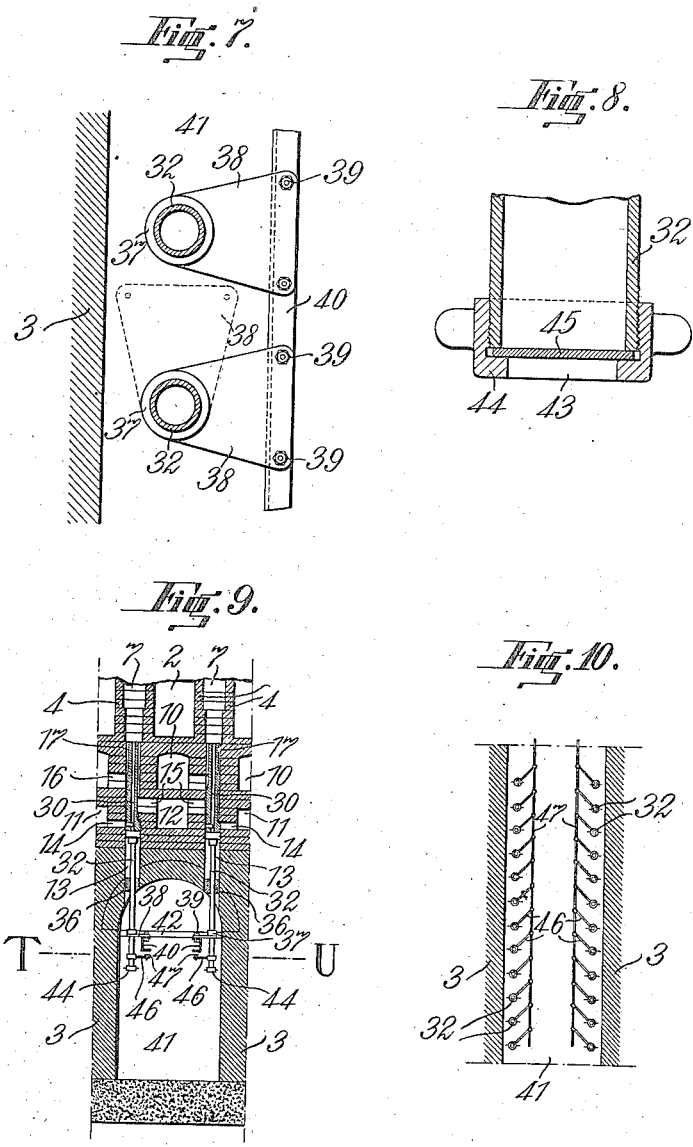

UNITED STATES PATENT OFFICE.

ARTHUR GOHMANN, OF STETTIN, GERMANY, ASSIGNOR TO STETTINER CHAMOTTE-FABRIK ACTIEN-GESELLSCHAFT VORM. DIDIER, OF STETTIN, GERMANY, A CORPORATION OF GERMANY.

GAS-PRODUCING OVEN.

1,024,128.  Specification of Letters Patent.  Patented Apr. 23, 1912.

Application filed June 21, 1911. Serial No. 634,578.

*To all whom it may concern:*

Be it known that I, ARTHUR GOHMANN, a subject of the German Emperor, and resident of Stettin, Germany, have invented certain new and useful Improvements in Gas-Producing Ovens, of which the following is a specification.

My invention relates to gas-producing ovens (such as, for instance, coke ovens) provided with heating flues, and has for its object to enable the operator to cause the combustion gases to travel through the heating flues continuously in the same direction, or alternately in opposite directions, as desired. For this purpose each heating flue is connected at the same end with three valved channels or conduits, through which the alternate admission of heating gas and air and withdrawal of combustion gases may be effected.

I prefer to employ a common, rotary, removable valve for alternately shutting off the channels for the admission of gas and air to each of the heating flues and for the escape of the combustion gases therefrom. The new arrangement of channels devised by me is applicable to longitudinal ovens, whether horizontal or inclined, and also to upright or vertical ovens.

Reference is to be had to the accompanying drawings, in which—

Figure 1 is a longitudinal section through one form of my improved oven, taken on line A—B of Fig. 2; Fig. 2 is a cross section of the oven, the left-hand portion on the line C—D of Fig. 1, and the right-hand portion on the line E—F of Fig. 1; Fig. 3 is a detail vertical section through one of the shut-off valves and a portion of the oven base, drawn on line G—H of Fig. 1 and upon an enlarged scale; Fig. 4 shows, in superposed arrangement, four horizontal sections taken respectively on lines I—K, L—M, N—O and P—Q of Fig. 3; Fig. 5 is a vertical section similar to Fig. 3, but with the valve in a different position; Fig. 6 shows, in superposed arrangement, four horizontal sections on the same planes as the corresponding portions of Fig. 4, but with the valve in the same position as in Fig. 5; Fig. 7 is a horizontal section on line R—S of Fig. 1, drawn upon an enlarged scale; Fig. 8 is an enlarged vertical section through the lower end of one of the pipes serving to turn the shut-off valves; Fig. 9 is a vertical cross section through a portion of an oven in which the pipes serving to turn the shut-off valves are operatively connected in rows; and Fig. 10 is a horizontal section on line T—U of Fig. 9.

1 designates the block or bench of ovens provided, in the example illustrated, with horizontal coking chambers 2, and resting upon supporting walls 3 which are arranged under alternate coking chambers 2. These chambers are separated from each other by heating walls 4 in each of which I provide a set of vertical heating flues 7, formed by partitions 5 and 6 (Fig. 1). The solid partitions 5 extend to the roof of the oven, while the partitions 6 are interrupted near the roof, so as to leave a space or passage 9.

The left-hand and right-hand halves of Fig. 1 illustrate different examples of heating flue arrangements. As shown at the left, the solid and the apertured partitions alternate regularly, that is to say, there is one partition 6 between each two partitions 5, so that the flues 7 are connected in pairs at their upper ends. In the construction represented at the right of Fig. 1, three apertured partitions 6 intervene between each two solid partitions 5, so that the heating flues 7 are connected at their upper ends in groups of four flues each.

Beneath the coking chambers 2 horizontal channels 10, ranging lengthwise of said chambers, are arranged in the base or sole of the oven, to carry away the combustion gases. Below these outlet channels 10 I arrange alternate horizontal channels 11 and 12 respectively which extend lengthwise of the coking chambers 2, the channels 11 serving to supply the heating gas, and the channels 12 for the admission of the air to support combustion. The combustion gases and the air for supporting combustion always travel in the same direction through the channels 10 and 12 respectively. Regenerators or recuperators (not shown) may be connected with the channels 10 and 12, in a manner well known in the art.

With the lower end of each heating flue 7 is connected a vertical duct 13 of circular cross section arranged in the base of the oven.

Each of these ducts is connected at different levels with a branch duct 14 adapted to receive gas from one of the channels 11, a branch duct 15 adapted to receive air from one of the channels 12, and a branch duct 16 adapted to convey the combustion gases to one of the channels 10 (see Figs. 2 to 6). Inasmuch as each of the channels 11 and 12 is intended to supply two rows of heating flues 7 with gas and air respectively, branch ducts 14, 15 lead from each side of these channels 11, 12 to the corresponding vertical ducts 13. Since there is a separate outlet channel 10 for each row of heating flues 7, branch ducts 16 lead only from one side of the outlet channels to the respective vertical ducts 13. Each vertical duct 13 (Fig. 3) is of a smaller diameter at its upper portion 22 than at its lower portion 23, and between the said portions it is provided with a conical seat 24.

In each of the ducts 13 is mounted to turn a removable shut-off valve 17 consisting of refractory stone. The lower part 18 of this valve fits the wide portion 23 of the duct 13. The upper part 19 of the valve is of a materially smaller diameter than the upper portion 22 of the duct, so that an annular passage 20 is formed around this part of the valve. The upper part 19 of the valve extends upward to the lower end of the heating flue 7. At the upper end of the lower part 18 of the valve a conical surface 25 is provided which is adapted to fit tightly (to prevent the passage of gas or air) against the corresponding seat 24 of the duct 13.

The upper part 19 of the valve is provided at different levels with ribs 26, 27, 28, 29 fitted to the duct portion 22 and adapted to form controllers governing the flow of the air and of the combustion gases respectively. The lower controller consists of two vertical straight ribs 26 and a horizontal segmental rib 27. The ribs 26 are connected at their upper ends with the ends of the rib 27 and at their lower ends with the wide part 18 of the valve. The upper controller also consists of two vertical straight ribs 28 and a horizontal segmental rib 29 which however is shorter than the rib 27. The ribs 28 are connected at their upper ends with the ends of the rib 29 and at their lower ends with the rib 27 of the lower controller. The controller 26, 27 is at the same level with the branch duct 15 serving to supply air and discharging into the annular passage 20 adjacent to its lower end. The controller 28, 29 is disposed at the same level with the branch duct 16 serving to carry away the combustion gases and connected with the annular passage 20 midway between its ends.

The valve 17 is provided with an axial bore 30 extending from end to end. In the wide part 18 of the valve the bore 30 is connected with a radial passage 31 leading to the periphery of said part 18 and located at the same level with the branch duct 14 adapted to supply the heating gas. The horizontal passage 31 and the controllers 26, 27 and 28, 29 of the valve 17 are so arranged relatively to the corresponding branch ducts 14, 15 and 16 respectively that by turning the valve 17 the heating flue 7 can be connected alternately either with the branch ducts 14, 15 serving to supply the heating gas and air respectively, or with the branch duct 16 serving to carry away the combustion gases. In the position of the valve 17 illustrated by Fig. 3, the horizontal valve passage 31 is connected with the duct 14 which supplies the heating gas, while the controller 26, 27 has opened the connection with the air-supply duct 15 and the controller 28, 29 shuts off communication with the outlet duct 16. With the valve in this position, the heating gas is enabled to pass from the duct 14 through the horizontal valve passage 31 and the central bore 30 into the heating flue 7, while at the same time the air for supporting combustion can travel from the duct 15 to the annular passage 20 and the heating flue 7. If the valve is given half a turn (180°), so as to take the position shown in Fig. 5, the horizontal valve passage 31 will be shut off from the duct 14 for supplying the heating gas, while the air supply duct 15 will be shut off by the controller 26, 27, and communication with the outlet duct 16 will be opened by the controller 28, 29. With the valve in this position, the combustion gases can pass from the heating flue 7 through the annular passage 20 and into the outlet duct 16.

For the purpose of turning the valves 17, each of them is provided with a vertical pipe 32 having a head 33 at its upper end (Fig. 3). This head fits tightly into the duct portion 23 and around a lug 34 projected from the lower end of the valve part 18. The lug 34 has flat surfaces 35 (Figs. 4ᶜ and 6ᶜ) engaging corresponding plane surfaces of the head 33. Thus the valve 17 is compelled to rotate with the pipe 32 and head 33, yet, when required, the valve can be separated readily from the head 33 by an axial movement.

Each of the pipes 32 is mounted to turn in a plug 36 fitted tightly into the lower portion 23 of the duct 13. The lower end of the pipe projects from this duct and carries a ring 37 secured rigidly to the pipe by means of a pin or the like and engaging with its lower surface a bearing bracket 38 perforated for the passage of the pipe 32. This bracket therefore serves as a support and guide for the pipe 32. The brackets 38 belonging to the several rows of pipes 32 are removably secured to U-shaped supports 40 by means of screws 39 (Fig. 7). These supports extend lengthwise of the oven within the master channels 41 and are secured at the ends in the foundation masonry of the oven. Beams 42 likewise embedded in the foundation masonry at their ends, extend transversely through the master channels 41 and brace the U-shaped supports 40.

At the lower end of each pipe 32 a transparent plate or disk 45 made of mica, glass or the like is secured by means of a cap 44 (Fig. 8) screwed upon the pipe and provided with an opening 43. With this arrangement, the combustion process within the heating flue 7 may be watched through the transparent pane 45, the inside of the pipe 32 and the axial bore of the valve 17.

The oven described above can be operated in two different ways, either with the flames constantly in the same direction within the heating flues, or with a periodical reversal of the flames' direction.

If the heating flues 7 are connected in pairs, as at the left of Fig. 1, the valve 17 belonging to one of the flues of each pair may, at a particular moment, be in the position illustrated by Fig. 3 (in which the valve admits air and gas to such flue) while the valve 17 belonging to the other flue of each pair is in the position illustrated by Fig. 5 (in which the valve allows the combustion gases to escape from the respective flue). Thus the combustion gases will travel upward in one of the heating flues 7 of each pair and downward in the other. At the operator's choice, the shut-off valves 17 may be adjusted either so as to cause the combustion gases to ascend in the left-hand flue of each pair and to descend in the right-hand flue, or to rise in the right-hand flue, and travel down in the left-hand flue of each pair.

When it is intended to operate the oven in such a manner that the gases will travel continuously in the same direction in the heating flues 7, the shut-off valves 17 are left permanently in the same position. If however it is desired to reverse the flow of gases periodically in the pairs of heating flues 7, then the shut-off valves 17 are given half a turn at suitable intervals of time, so that those flues which until then were connected with the branch ducts 14 and 15 serving to supply heating gas and air respectively, will be placed in communication with the branch ducts 16 serving to carry away the combustion gases. At the same time those heating flues 7 which until then were connected with the branch ducts 16, will be placed in communication with the branch ducts 14, and 15. The flow of gases may be reversed in all pairs of heating flues 7 or only in some of them, as desired, by a proper manipulation of the several valves 17. In this particular construction, each pair of connected flues 7 forms a heating channel. A similar operation may be employed in the case of an oven having groups each containing four heating flues 7, as shown at the right-hand portion of Fig. 1. In this case it is preferable to always have the valves 17 belonging to the two flues 7 at the left-hand end of each group, in the same position, and similarly, the valves of the two flues at the right-hand end of each group ought to be in the same position, the position of the valves of such flues at the left differing from the position of the valves of the flues at the right. Thus the gases will travel upward in the two flues at the left-hand end of each group, and downward in the two flues at the right-hand end of each group, or vice-versa, according to the position of the valves 17. In this case, each group of four flues forms a heating channel, with two ascending inlet members and two descending outlet members. By giving all the valves 17 or some of them half a turn the flow of the combustion gases may be reversed in all the groups of heating flues or only in some groups, as desired.

In case of need, one or more pairs or groups of heating flues may be disconnected entirely and thus thrown out of operation, by bringing all the valves 17 of such pairs or groups into a position in which the corresponding gas-supply ducts 14 and air-supply ducts 15 are shut off. If the shut-off valves 17 are clogged up or injured, or are to be removed for any other reason, they may be withdrawn downward from the ducts 13. If one of the valves 17 is to be taken out, the corresponding plug 36 is pushed downward along the pipe 32, out of the duct 13, and the corresponding brackets 38 after loosening the screws 39, is swung into the position indicated in Fig. 7 by dotted lines. This releases the pipe 32 and valve 17 for downward movement in the duct 13. When the pipe 32 has been withdrawn from the said duct, the head 33 is disconnected by an axial movement from the lug 34 of the valve 17 and the pipe is removed sidewise. The valve 17 may then be withdrawn entirely from the duct 13 and likewise removed laterally.

Obviously, the amount of gas supplied to each individual flue 7 depends on the cross section of the longitudinal bore or passage 30 and of the duct 31, and similarly, the amount of air supplied (and the speed at which the combustion gases are withdrawn) depend on the cross section of the annular passage 20 and of the ducts connected therewith. The valves 17 being withdrawn readily, I can easily substitute for them other valves of the same general construction but differing as to the cross section of the several passages. Thus, by the substitution of differently constructed valves 17 in the ducts 13, the cross sectional area of the passages for admitting air and gas and carrying away the combustion products respectively may be varied, so as to regulate the supply of gas and air to the heating flues 7, and the escape of combustion products therefrom.

In order to facilitate the reversal of the flame direction in the pairs or groups of heating flues, the shut-off valves 17 may be operated by means of actuating devices common to all flues of a group or of a row. In the construction illustrated by Figs. 9 and 10 levers 46 are secured for this purpose to the lower ends of the pipes 32. All levers 46 belonging to the pipes 32 of the same row are connected with a common actuating device 47 which may consist of a wire or other flexible connection located within one of the master channels 41 and winding upon drums (not shown) disposed within said channels or above the masonry foundation. By means of such drums or other suitable devices the wire 47 may be moved in one direction or the other to reverse the respective valves 17. The valves connected by the levers 46 and wire or other actuating device 47 are turned through an angle of a little less than 180° at the moment of reversal. One of the end positions of these connected valves corresponds to the position shown in Figs. 3 and 4.

Various modifications may be made without departing from the nature of my invention as set forth in the appended claims.

I claim:

1. A gas-producing oven provided with three ducts for the supply of gas and air and for the escape of the combustion gases respectively, connected heating flues each of which is connected with said ducts at the same end, and unitary means each controlling the connection of one of said flues with all three of the corresponding ducts.

2. A gas-producing oven provided with connected heating flues, ducts, connected with the free ends of said flues, for supplying a combustible mixture and carrying away combustion products respectively, and reversible unitary means each controlling all the ducts connected with one of said flues so that the combustion gases may be caused to travel through said flues in one direction or the other.

3. A gas-producing oven provided with connected heating flues, ducts for supplying a combustible mixture and carrying away combustion products respectively, connections from the free ends of the heating flues to said ducts, and valves each of which controls the alternate connection of one such free end with the supply and the escape ducts respectively.

4. A gas-producing oven provided with a heating channel having ends adapted to serve alternately as an inlet and as an outlet respectively, ducts for supplying a combustible mixture and carrying away combustion products respectively, connections from said channel ends to said ducts, and valves each of which controls the connection of one such end with the supply and escape ducts respectively.

5. A gas-producing oven provided with a heating channel having ends adapted to serve as an inlet or as an outlet, ducts for supplying gas and air and for carrying away combustion products respectively, connections from said channel ends to said ducts, and valves each of which controls simultaneously the three connections of one channel end with the air supply, gas supply, and escape ducts respectively.

6. A gas-producing oven provided with heating flues, ducts for supplying a combustible mixture and carrying away combustion products respectively, and rotary valves each of which controls the connection of one of said flues with ducts of both kinds.

7. A gas-producing oven provided with heating flues, ducts for supplying a combustible mixture and carrying away combustion products respectively, vertical channels arranged in the base of the oven and connected with said ducts and flues, and removable rotary valves located in said vertical channels and adapted to control the connection of said ducts with the flues.

8. A gas-producing oven provided with heating flues, ducts for supplying a combustible mixture and carrying away combustion products respectively, and valves mounted to turn about vertical axes, each valve controlling the connection of one of said flues with both kinds of ducts.

9. A gas-producing oven provided with heating flues, ducts for supplying a combustible mixture and carrying away combustion products respectively, and rotary valves controlling the connection of said ducts with said flues, said valves being provided with longitudinal passages through which fuel may travel to the heating flues.

10. A gas-producing oven provided with heating flues, ducts for supplying a combustible mixture and carrying away combustion products respectively, valve ducts connected with said flues, and valves mounted to turn in said valve ducts, one portion of each valve being of a materially smaller diameter than the corresponding portion of the valve duct so as to form around said valve portion an annular chamber connected with the supply or the escape duct, according to the position of said valve.

11. A gas-producing oven provided with a heating channel, valve ducts connected therewith, a longitudinally perforated valve mounted to turn in each of said ducts, a gas-supply duct arranged to communicate with the longitudinal perforation of the valve, one portion of said valve being of a materially smaller diameter than the corresponding portion of the valve duct so as to form an annular chamber around said portion, two controllers connected with the valve at different points of said chamber, an air-supply duct governed by one of said controllers to be open to the heating flue at the same time as the gas-supply duct, and an escape duct governed by the other controller to be closed when the other ducts are open, and vice versa.

12. A gas-producing oven provided with a heating channel, valve ducts connected therewith, and made wider at one end than at the other, with a tapered intermediate portion, ducts for supplying a combustible mixture and for carrying away combustion products respectively, and valves each mounted to turn in one of said valve ducts and provided with a conical portion fitted to said tapered portion of the valve duct, said valves controlling the connection of the heating channel with the supply and escape ducts respectively.

13. A gas-producing oven provided with heating flues, ducts for supplying a combustible mixture and for carrying away combustion products respectively, rotary valves for controlling the connection of said flues with said ducts, and a rotary member detachably connected with one end of each valve to operate the valve and to slide it lengthwise for removal or insertion.

14. A gas-producing oven provided with heating flues, ducts for supplying a combustible mixture and for carrying away combustion products respectively, rotary valves for controlling the connection of said flues with said ducts, said valves being perforated lengthwise, a rotary pipe detachably connected with one end of each valve in alinement therewith, to operate the valve and to slide it lengthwise for removal or insertion, and a transparent pane for closing said pipe and affording opportunity for inspection through the pipe and valve.

15. A gas-producing oven provided with heating flues, ducts for supplying a combustible mixture and for carrying away combustion products respectively, rotary valves each of which controls the connection of one of said flues with ducts of both kinds, and an operative connection whereby a plurality of said valves will be made to move in unison.

In testimony whereof, I have signed this specification in the presence of two subscribing witnesses.

ARTHUR GOHMANN.

Witnesses:
EMIL SCHMIDT,
GEORGE LILIEQUIST.